US012541689B2

United States Patent
Jafari et al.

(10) Patent No.: US 12,541,689 B2
(45) Date of Patent: Feb. 3, 2026

(54) KNOWLEDGE DISTILLATION BY UTILIZING BACKWARD PASS KNOWLEDGE IN NEURAL NETWORKS

(71) Applicants: Aref Jafari, Waterloo (CA); Mehdi Rezagholizadeh, Montreal (CA); Ali Ghodsi, Waterloo (CA)

(72) Inventors: Aref Jafari, Waterloo (CA); Mehdi Rezagholizadeh, Montreal (CA); Ali Ghodsi, Waterloo (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1093 days.

(21) Appl. No.: 17/359,463

(22) Filed: Jun. 25, 2021

(65) Prior Publication Data

US 2021/0383238 A1 Dec. 9, 2021

Related U.S. Application Data

(63) Continuation of application No. PCT/CA2021/050776, filed on Jun. 5, 2021.

(60) Provisional application No. 63/035,613, filed on Jun. 5, 2020.

(51) Int. Cl.
*G06N 3/084* (2023.01)
*G06F 40/284* (2020.01)
*G06N 3/045* (2023.01)
*G06N 3/0495* (2023.01)
*G06N 3/09* (2023.01)
*G06N 3/096* (2023.01)

(52) U.S. Cl.
CPC ........... *G06N 3/084* (2013.01); *G06F 40/284* (2020.01); *G06N 3/045* (2023.01)

(58) Field of Classification Search
CPC ....... G06N 3/084; G06N 3/045; G06F 40/284
See application file for complete search history.

(56) References Cited

U.S. PATENT DOCUMENTS

| 2020/0134506 A1* | 4/2020 | Wang | G06N 3/088 |
|---|---|---|---|
| 2021/0064785 A1* | 3/2021 | Liu | G06F 21/577 |
| 2021/0142127 A1* | 5/2021 | Lee | G10L 15/1815 |

OTHER PUBLICATIONS

Fu et al., "Role-Wise Data Augmentation for Knowledge Distillation", Apr. 19, 2020, arXiv preprint arXiv:2004.08861 (Year: 2020).*

(Continued)

*Primary Examiner* — Kamran Afshar
*Assistant Examiner* — Steven Phung

(57) ABSTRACT

Methods and systems are provided for compressing a deep neural network (NN) model using knowledge distillation. The method includes training a student NN model to minimize a first loss between student model output values generated by the student NN model for a set of original input values and teacher model output values generated by a teacher NN model for the set of original input values, generating, for at least some of the original input values, a respective perturbed value that maximizes a second loss between an output value generated by the student NN model and an output value generated by the teacher NN model, adding the perturbed values to the set of original input values to provide a set of augmented input values and retraining the student NN model using the set of augmented input values.

20 Claims, 9 Drawing Sheets

(56) References Cited

OTHER PUBLICATIONS

Li et al., "Urban Flood Mapping with an Active Self-Learning Convolutional Neural Network Based on TerraSAR-X Intensity and Interferometric Coherence", Apr. 28, 2019, ISPRS Journal of Photogrammetry and Remote Sensing 152 (2019):, pp. 178-191. (Year: 2019).*
Perolat et al., "Playing the Game of Universal Adversarial Perturbations", Sep. 25, 2018, arXiv preprint arXiv:1809.07802 (Year: 2018).*
Piech Chris, "Gradient Ascent", Mar. 31, 2019, Stanford University (Year: 2019).*
Chen et al., "Structured Knowledge Distillation for Semantic Segmentation", Jan. 9, 2019, Proceedings of the IEEE/CVF conference on computer vision and pattern recognition, pp. 2604-2613 (Year: 2019).*
Buciluă, C. et al. "Model compression" InProceedings of the 12th ACM SIGKDDinternational conference on Knowledge discovery and data mining. 2006.
Hinton, G. et al. "Distilling the Knowledge in a Neural Network" arXiv preprint arXiv:1503.02531. 2015.
Czarnecki, W.M. et al. "Sobolev Training for Neural Networks" 31st Conference on Neural Information Processing Systems (NIPS 2017). 2017.
Lijun Wu et al: "Learning to Teach with Dynamic Loss Functions." arXiv:1810.12081v1 [cs.LG] Oct. 29, 2018. total 18 pages.
Sining Sun et al: "Training Augmentation with Adversarial Examples for Robust Speech Recognition." arXiv:1806.02782v2 [cs.CL] Jun. 17, 2018. total 5 pages.
Lijun Wu et al: "Learning to Teach with Dynamic Loss Functions", arxiv.org, Cornell University Library, 201 Olin Library Cornell University Ithaca, NY 14853, Oct. 29, 2018 (Oct. 29, 2018) XP080932815, total 15 pages.
Sining Sun et al: "Training Augmentation with Adversarial Examples for Robust Speech Recognition", arxiv.org, Cornell University Library, 201 Olin Library Cornell University Ithaca, NY 14853, Jun. 7, 2018 (Jun. 7, 2018), XP080888262, total 5 pages.

\* cited by examiner

Algorithm 1

1: function VANILLA-KD(S,T,X,e)         ▷ S is the student network, T is the teacher network, X is input dataset, e is #epochs
2:
3: for $i = 1$ to $e$ do
4:     for $x = getBatch(X)$ do         ▷ getBatch(.) returns a batch of X each time
5:         $L = (1-\lambda)H(softmax(S(x)), y) + \tau^2 KL(softmax(\frac{S(x)}{\tau}), softmax(\frac{T(x)}{\tau}))$
6:         for $j = 1$ to $length(S.w)$ do         ▷ w is the list of all internal parameters of network S
7:             $S.w[j] \leftarrow S.w[j] - \alpha \frac{\partial L}{\partial S.w[j]}$         ▷ $\alpha$ is the learning rate
8: return S

FIG. 1 (Prior Art)

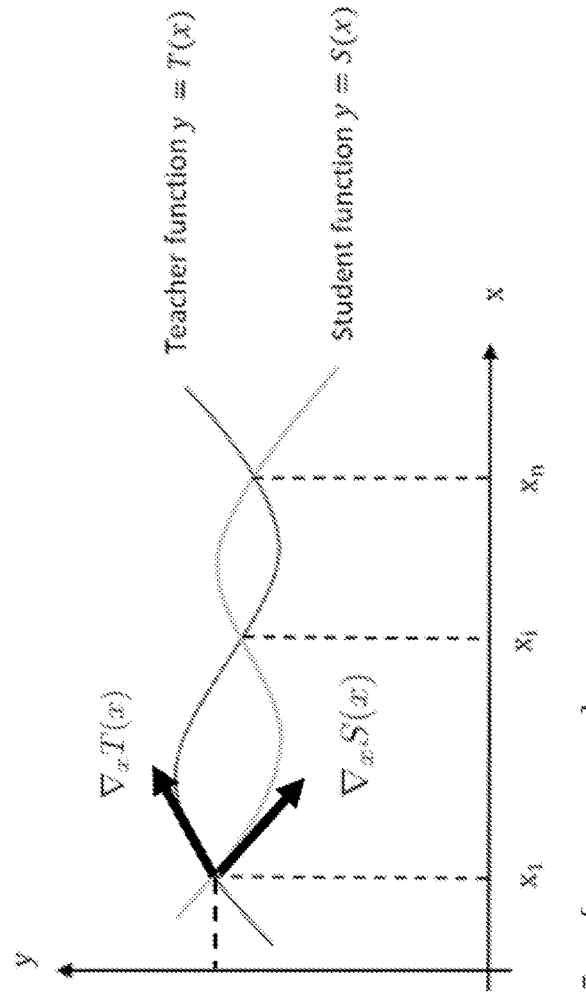

FIG. 2 (Prior Art)

Algorithm 2

1: function PROPOSED-KD(S,T,X, e, h)
2:     ▷ S is the student network, T is the teacher network, X is input dataset, e is #training epochs, h is #hyper epochs
3:     $X' \leftarrow X$
4:     for i = 1 to h do
5:         VANILLA-KD(S,T,X',e)    ⎫ Minimization Step 402
6:         $X' \leftarrow X$
7:         for $x'$ in $X'$ do
8:             while converge do
9:                 $x' \leftarrow x' + \eta \nabla_{x'} \|S(x') - T(x')\|_2^2$
10:         $X' \leftarrow X' \cup X$
11:     return S ⎫ Maximization Step 404

FIG. 5A

Algorithm 3

1: function PROPOSED-KD($S,T,X,e,h$)
2: ▷ $S$ is the student network, $T$ is the teacher network, $X$ is input dataset, $e$ is #training epochs, $h$ is #hyper epochs
3: $W_T \leftarrow$ EMBEDDING-MATRIX($T$)
4: $W_S \leftarrow$ EMBEDDING-MATRIX($S$)
5: $Z_T \leftarrow W_T X$
6: $Z_S \leftarrow W_S X$
7: $Z'_T \leftarrow Z_T$
8: $Z'_S \leftarrow Z_S$
9: for $i = 1$ to $h$ do
10:    VANILLA-KD($S,T,Z'_T,Z'_S,e$)
11:    $Z'_T \leftarrow Z_T$
12:    $Z'_S \leftarrow Z_S$
13:    for $(z'_S, z'_T)$ in $(Z'_S, Z'_T)$ do
14:      while converge do
15:        $z'_S \leftarrow z'_S + \eta \nabla_{z_S} \|S(z_S) - T(z_S)\|^2_{1,S}$
16:        $z'_T \leftarrow W_T W_S (W_S^\top W_S)^{-1} z'_S$
17:    $Z'_S \leftarrow Z'_S \cup Z_S$
18:    $Z'_T \leftarrow Z'_T \cup Z_T$
19: return $S$

FIG. 7

KNOWLEDGE DISTILLATION BY UTILIZING BACKWARD PASS KNOWLEDGE IN NEURAL NETWORKS

REFERENCE TO RELATED APPLICATIONS

The present application is a continuation of International Patent Application No PCT/CA2021/050776, filed on Jun. 5, 2021 and entitled "IMPROVED KNOWLEDGE DISTILLATION BY UTILIZING BACKWARD PASS KNOWLEDGE IN NEURAL NETWORKS", which claims the benefits of priority to U.S. Provisional Patent Application No. 63/035,613, filed Jun. 5, 2020 and entitled "IMPROVED KNOWLEDGE DISTILLATION BY UTILIZING BACKWARD PASS KNOWLEDGE IN NEURAL NETWORKS", the contents of which is hereby incorporated by reference in its entirety.

TECHNICAL FIELD

The present disclosure relates to compression of models learned using machine learning, and in particular models that are learned using deep learning.

BACKGROUND

Recently, there has been an emergence of a large number of cumbersome state-of-the-art machine learning (ML) models that are learned using deep learning, and in particular ML models learned using a deep neural network (generally known as deep neural network (DNN) models). DNN models are neural network (NN) models that comprise multiple hidden NN layers. DNN models are now commonly applied in different fields of machine learning, including machine vision and natural language processing. A trained DNN model includes a very large number of learned parameters. The large number of learned parameters and the large number of computations required to apply such parameters can render deployment of a trained DNN model to a resource constrained computing device nearly impossible. A resource constrained computing device, can, for example, include a device that has one or more of limited memory, limited processing power, and limited power supply, such as an edge computing device.

Model compression is a known technique used to compress a DNN model to reduce the number of learned parameters in the trained DNN model so that the compressed trained DNN model may be deployed to a resource constrained computing device for prediction with minimum loss of accuracy in the performance of the prediction. One of the most efficient ways to compress a DNN model is to use a technique known a knowledge distillation (KD). A KD methodology was proposed in "Distilling the Knowledge in a Neural Network" by Geoffrey Hinton, *arXiv preprint arXiv:*1503.02531, referred to hereinafter as vanilla KD. Vanilla KD is an efficient method for distilling knowledge from a DNN model learned on a non-resource constrained computing environment (generally known as a teacher DNN model) to a smaller DNN-based student model.

In vanilla KD, the process of transferring knowledge from a teacher DNN model to a student DNN model is accomplished by minimizing a loss function between the logits generated by the teacher deep neural network model and the logits generated by the student deep neural network model for the same input dataset (logits are the numeric output of the last linear layer of the DNN model). The KD loss function is used in addition to the standard loss function for backpropagation during training of the student DNN model. In other words, there is an additional loss term used for the KD loss function between the softmax output of teacher DNN model and student DNN model, which is softened by a temperature term. The advantage of using a softmax function in the last layer of a DNN is that the softmax function turns logits into probabilities by taking the exponents of each logit and then normalizing each logit by the sum of those exponents so that all probabilities add up to one. However, the exponential term in the numerator of softmax function intensifies the higher values and weakens the lower values. This can effectively diminish relative information between different predictions (logits). To alleviate this effect of the softmax output of the teacher DNN, vanilla KD adds a temperature parameter to the KD loss function which softens the resulting probability distribution of the output of the student DNN and enhances capturing this information. The vanilla KD objective function defines as:

$$L = \\ (1-\lambda)H(\text{softmax}(S(x)), y) + \tau^2 \lambda \text{KL}\left(\text{softmax}\left(\frac{S(x)}{\tau}\right), \text{softmax}\left(\frac{T(x)}{\tau}\right)\right) \quad (I)$$

where $H(\cdot)$ is the cross-entropy loss function, $KL(\cdot)$ is the Kullback Leibler divergence loss function, $\lambda$ is a hyper parameter for controlling tradeoff between two loss functions, $\tau$ is the temperature parameter, and y is the true labels. Also $S(\cdot)$ and $T(\cdot)$ are student and teacher networks. FIG. 1 shows an algorithm (referred to as Algorithm 1) for implementing vanilla KD.

Vanilla KD attempts to match the output of the student DNN model to the output of the teacher DNN model based on knowledge extracted from forward passes of training data samples through the teacher DNN model. Although vanilla KD can be effective for training student DNN model to match the outputs of the teacher DNN model for data samples that are included in the training dataset that is used for the knowledge distillation, there is no guarantee that the outputs of the teacher and student DNN models will match for data samples that vary from those included in the training dataset. Most of the time, after training the student DNN model with the vanilla KD loss function, the output of the student DNN model will only consistently match that of the teacher DNN model for input data samples that correspond to training data samples in the original training dataset.

As illustrated in FIG. 2, a student DNN model trained using all training data samples of a training dataset and the vanilla KD loss will be trained to generate predictions that match the teacher DNN model for the training data samples. This is represented in FIG. 2 where the predictions y of the teacher function (i.e., the function approximated by trained teacher DNN model) and the student function (i.e., the function approximated by trained student DNN model) are identical for training data samples $x_1$, $x_i$ and $x_n$. However, the gradients of the teacher and student DNN models do not match for the training data samples. This is because vanilla KD uses the logits of the teacher DNN model as the only source for extracting knowledge. In other words, vanilla KD only extracts knowledge during the forward pass of training data samples through the teacher DNN model. This knowledge extracted during the forward pass only provides information about the behaviour of the teacher DNN model in the exact areas of a possible sample space where the training data samples actually exist. However, in the possible sample space areas for the teacher DNN model where training data samples do not exist, the behaviour of the teacher neural network model in these areas cannot be understood based on the logits of the teacher DNN model.

Thus, as shown in FIG. 2, although a student DNN model trained using the vanilla KD loss function and its teacher DNN model will converge in the areas around the training data samples, there is no guarantee for their convergence in other areas. Some proposed solutions attempt to overcome the problem of prediction divergence by training the student DNN model to match the gradient of the output of a training data sample with respect to a gradient of an input of the training data sample. However, because the input and the output training data samples are multidimensional vectors, the gradients of output vector with respect to the input vector may result in large Jacobin matrices and matching these Jacobian matrices is not practical in real-world problems.

Accordingly, improvements to DNN model compression using knowledge distillation are therefore desirable.

SUMMARY

The present disclosure relates to a method, computing apparatus, and system for model compressing using knowledge distillation that address the problem of the convergence of a teacher deep neural network model and the student deep neural network model in areas where the teacher deep neural network model diverges significantly from the student deep neural network model.

The method, computing apparatus, and system of the present disclosure generate new auxiliary training data samples in the areas where the student diverges greatly from the teacher deep neural network model. The method of the present disclosure computes a difference between the output of the teacher deep neural network model and an output of the student and generate new training data samples that maximize a divergence between the teacher deep neural network model and the student neural network model. The new auxiliary training data samples are added to the training dataset and training of the student deep neural network is repeated using the training dataset that includes the new auxiliary data samples. The divergence between the teacher deep neural network model and the student neural network model is maximized by perturbing the inputs of training data samples. Advantageously, augmenting the training dataset to include new auxiliary training data samples and re-training the student deep neural network using the training dataset that includes the original training data samples and the auxiliary training data samples leads to a closer match in the performance between the teacher neural network model and the student neural network model.

According to a first example aspect is a computer implemented method that includes: training a student neural network (NN) model to minimize a first loss between student model output values generated by the student NN model for a set of original input values and teacher model output values generated by a teacher NN model for the set of original input values; generating, for at least some of the original input values, a respective perturbed value that maximizes a second loss between an output value generated by the student NN model and an output value generated by the teacher NN model; adding the perturbed values to the set of original input values to provide a set of augmented input values; and retraining the student NN model to minimize the first loss between output values generated by the student NN model for the set of augmented input values and output values generated by the teacher NN model for the set of augmented input values.

The method of the first aspect allows both forward pass knowledge (i.e. forward propagation) and back propagation knowledge to be transferred to the student NN model. This can in some embodiments improve the accuracy of the student NN model, thereby enabling a student NN model that is a compressed version of the teacher NN model to be deployed to computer devices that, when compared to the computer device used to train the teacher NN model, have one or more of: less powerful processors, lower power consumption, a smaller power supply, and/or less processor memory and other types of memory In some examples of the first aspect, the method may include after retraining the student NN model: generating, for at least some of the original input values, a further respective perturbed value that maximizes the second loss between an output value generated by the student NN model and an output value generated by the teacher NN model; adding the further perturbed values to the set of original input values to provide a further set of augmented input values; and further retraining the student NN model to minimize the first loss between output values generated by the student NN model for the further set of augmented input values and output values generated by the teacher NN model for the further set of augmented input values. These steps can be repeated until a desired target is achieved.

In one or more examples of the first aspect, generating the respective perturbed value for an input value may include applying stochastic gradient ascent to select, as the perturbed value, a perturbed version of the input value that maximizes the second loss between the output values of the student NN model and teacher NN model.

In one or more examples of the first aspect, the second loss may correspond to an $l_2$-norm loss function.

In one or more examples of the first aspect, generating the respective perturbed value for an original input value may include: setting an interim value equal to the original input value; generating a student model output value for the interim value and a teacher model output value for the interim value; determining a gradient of a squared difference between the student model output value and the teacher model output value; determining a perturbation value based on product of a defined perturbation rate and the gradient; adding the perturbation value to the interim value to update the interim value; repeating the forgoing to select the interim value that maximizes the gradient of the squared difference, and using the selected interim value as the respective perturbed value.

In one or more examples of the first aspect, the first loss may correspond to a vanilla knowledge distillation loss function.

In one or more examples of the first aspect, the student NN model and the teacher NN model may each be part of respective natural language processing models that are configured to perform natural language processing (NLP) prediction tasks, wherein: the original input values comprise: (i) a teacher set of input values that are vector embeddings of a set of token indexes generated in respect of a input text using a teacher model embedding matrix; and (ii) a student set of input values that are vector embeddings of the set of token indexes generated using a student embedding matrix; training the student NN model comprises: training the student NN model to minimize the first loss between student model output values generated by the student NN model for the student set of input values and teacher model output values generated by the teacher NN model for the teacher set of input values; generating the respective perturbed value for one of the original input values comprises: (i) generating a teacher perturbed value and a student perturbed value, respectively, for the teacher value and the student value that that correspond to the original input value, wherein the teacher perturbed value and student perturbed value are related by a defined transform matrix and are generated to maximize the second loss between an output value generated by the student NN model for the student perturbed value and an output value generated by the teacher NN model for the teacher perturbed value; the set of augmented input values includes: (i) an augmented teacher set comprised of the teacher perturbed values and the teacher set of input values, and (ii) an augmented student set comprised of the student perturbed values and the student set of input values; and retraining the student NN model comprises: training the student NN model to minimize the first loss between student model output values generated by the student NN model for the augmented student set and teacher model output values generated by the teacher NN model for the augmented teacher set.

In one or more examples of the first aspect, the student perturbed values may be determined based on a gradient of the second loss computed with respect to the student perturbed values, and the teacher perturbed values are determined by transforming corresponding student perturbed values.

In one or more examples of the first aspect, the student NN model may be a compressed model relative to the teacher NN model.

According to a further aspect is a system comprising one or more processing devices and one or more memories storing non-transitory instructions that when executed by the one or more processing devices configure the one or more processing devices to perform any of the preceding methods of the first aspect.

According to a further aspect is a computer readable medium storing non-transitory instructions that when executed by one or more processing devices configure the one or more processing devices to perform any of the preceding methods of the first aspect.

BRIEF DESCRIPTION OF THE DRAWINGS

Reference will now be made, by way of example, to the accompanying drawings which show example embodiments of the present application, and in which:

FIG. 1 illustrates pseudo code of a vanilla KD algorithm;

FIG. 2 illustrates a graph of the output of each of a teach neural network model and a student neural network model with respect to an input of a training data sample when the student neural network model is trained using vanilla KD;

FIG. 5A illustrates pseudo code of an example algorithm for implementing the method of the present disclosure;

FIG. 7 illustrates pseudo code of an example algorithm for implementing the method of the present disclosure for a natural language processing task.

DETAILED DESCRIPTION

Figure 3:
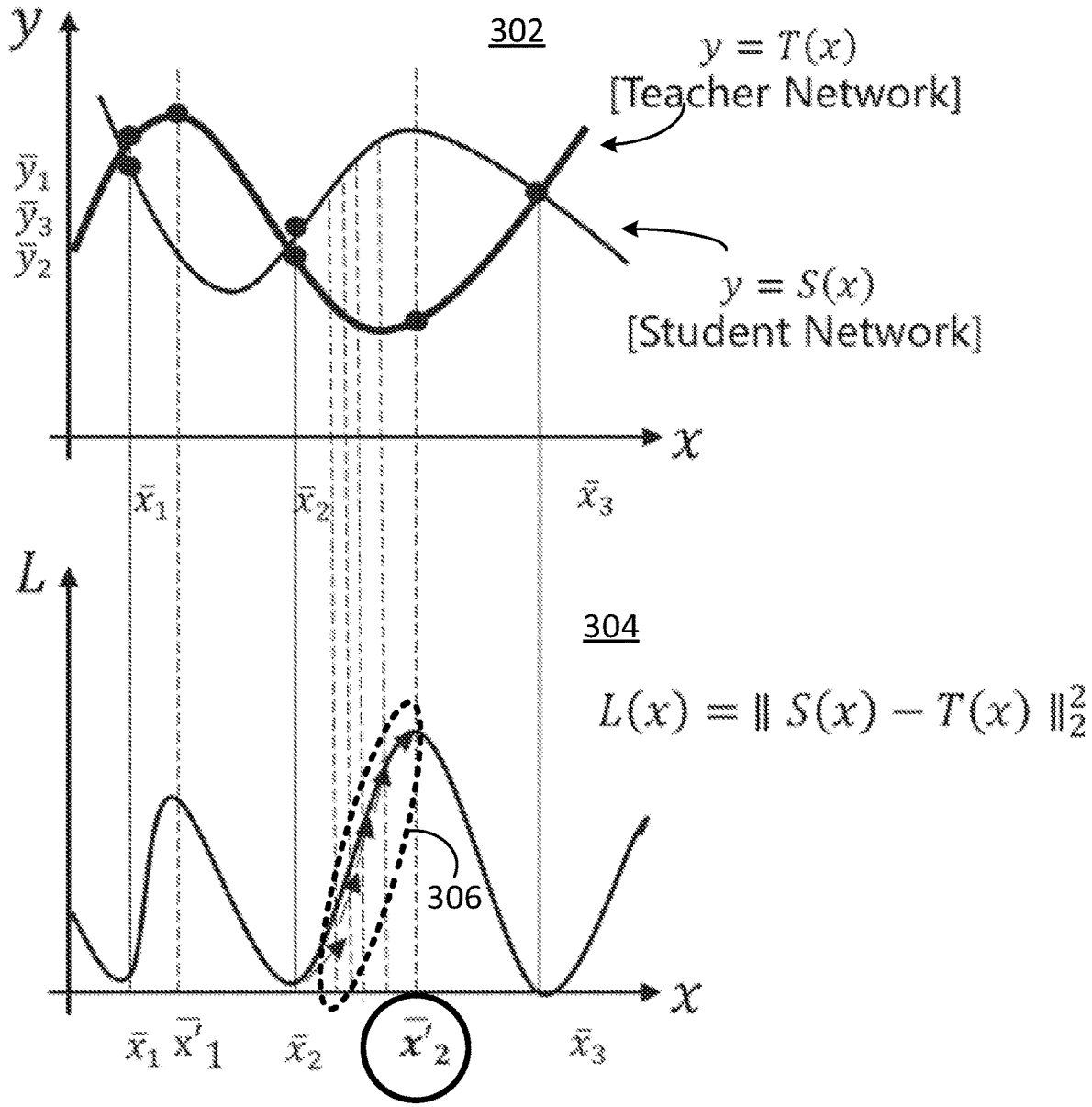
FIG. 3 illustrates a graph of the output of each of a teach neural network model and a student neural network model with respect to an input of a training data sample and a corresponding graph of the loss of the student neural network model with respect to an input of training data samples, illustrating how data samples can be perturbed to augment a training dataset according to aspects of the present disclosure.

For the purposes of the present disclosure, a training dataset is a set that includes a plurality training data samples. Each training data sample is an x, y tuple where x is an input value of the training data sample and y is a ground truth value, with the set of training samples being denoted as $\{(x_1, y_1), \ldots, (x_i, y_i), \ldots, (x_N, y_N)\}$. The ground truth value $y_i$ may correspond to a label that indicates a categorical value when the teacher and student DNN models are trained to perform a classification task. Alternatively, the ground truth value $y_i$ may correspond to a regression output in the form of a label that indicates a continuous value when the teacher and student DNN models are trained to perform a regression task. The teacher DNN model generates the training dataset based on an input dataset X of input values x, namely $X=\{x_1, \ldots, x_i, \ldots, x_N\}$.

For the purposes of the present disclosure, the performance of either the teacher neural network (NN) model or the student NN model may be measured using accuracy, BLEU score, F1 measure or mean square error.

For the purposes of the present disclosure, the outputs of the teacher and student NN models include the logits of the respective NN network models. In particular, the teacher and student NN models each map an input value $x_i$ to a respective set of logits $y_i$. These logits represent the prediction that is generated by the NN model for an input sample, and are determinative of an output label for the input sample.

For the purposes of the present disclosure, a teacher NN model is a trained NN model that has learned parameters (e.g. weights and biases that have been learned using a training dataset and a supervised or semi-supervised learning algorithm). The teacher NN model may, for example, be trained in a non-resource constrained environment, such as server, a cluster of servers, or a private or public cloud computing system, and includes a large number of learned parameters.

The present disclosure is directed to compressing a NN model using knowledge distillation. A teacher NN model is used to train a student NN model, which is a compressed NN model.

As suggested above, in the case of known KD solutions, there can be gaps in the knowledge that is transferred from a teacher NN to the student NN that correspond to gaps in the training dataset.

In the present disclosure, this problem is addressed by using information that is generated during the backward pass of the KD process (i.e. during backpropagation) to augment the training dataset. Training is based on a gradient of a $l_2$-norm loss function between the output of teacher NN model and the output of the student NN model w.r.t the input variable of a training data sample that is input to both the teacher and student NN models. By taking the gradient of the loss function w.r.t the input variable of a training data sample, the input variable of a training data sample can be perturbed in the direction of its gradients to increase the loss between teacher and student deep neural network models. The present disclosure considers the following optimization problem for compressing a DNN model using knowledge distillation:

$$x' = \max_{x} \|S(x) - T(x)\|_2^2 \qquad (II)$$

where: x' is a perturbed version of input data value x, S(x) represents the prediction function approximated by the student NN model and T(x) represents the predictions function approximated by the teacher NN model.

The above-noted optimization problem may be solved using stochastic gradient ascent. The perturbation of the input variable of each training data sample is represented mathematically as follows:

$$x^{i+1} = x^i + \eta \nabla_x \|S(x^i) - T(x^i)\|_2^2 \qquad (III)$$

where $\eta$ is the perturbation rate. This is an iterative process and i is the iteration index. $x^0$ is the input value of a training data sample $(x^0, y^0)$ and at each iteration, $x^i$ is the perturbed input value of the training data sample $(x^i, y^i)$ obtained by adding a portion of the gradient of loss to the input value $x^0$ of the training data sample. An example of implementation of this iterative process is a perturbation algorithm (Algorithm 2) which is shown in FIG. 5A.

Referring to FIG. 3, plot 302 shows an example of the teacher and the student DNN models in an original functional space for input values $\bar{x}_1, \bar{x}_2, \bar{x}_3$, along with respective output values $\bar{y}_1, \bar{y}_2, \bar{y}_3$. As noted above, both the input values x and output values y in the original functional space are multidimensional vectors. The $l_2$-norm loss function space between the teacher NN model T(x) and student NN model S(x) may then be considered. Plot 304 shows the $l_2$-norm loss function where the NN model T(x) and student NN model S(x) diverge in the original functional space. Because the L variable in the loss space is a single dimension vector, then the gradient of L with respect to input value x will be a vector with same size as the input value x, and thus the L variable does not have the Jacobian matrices problem noted above.

An example of perturbing input value $x \in \{\bar{x}_i, \ldots, \bar{x}_N\}$ of training data samples X can be illustrated as follows. Consider the original input value $\bar{x}_2$ shown in plot 304. When a perturbation algorithm that maximizes the $l_2$-norm loss function is applied to the input value $x_Z$ of the training data sample, after several iterations (represented by gradient arrows 306), a new input value $\bar{x}_2'$ can be generated that, in combination with the corresponding output value $\bar{y}_2'$ of teacher NN T(x) provides a new training data sample $(\bar{x}_2', \bar{y}_2')$. Plot 302 shows a large divergence between the teacher and student NN models for the perturbed input value $\bar{x}_2'$. The perturbation algorithm may be applied to the input value x of all training data samples in order to find auxiliary training data samples $(\bar{x}_l', \bar{y}_l')$ where there is maximum divergence between the output values of the student and teacher NN models. Then, the generated new auxiliary training data samples can be added to the original training dataset X to provide an augmented training dataset X' that is used to re-train the student NN model again using the vanilla KD algorithm. After re-training, the performance of the student NN model will more closely match the performance of the teacher NN model. This is because the training dataset now includes training data samples in the areas where student and teacher NN models have maximum divergence.

Figure 4:
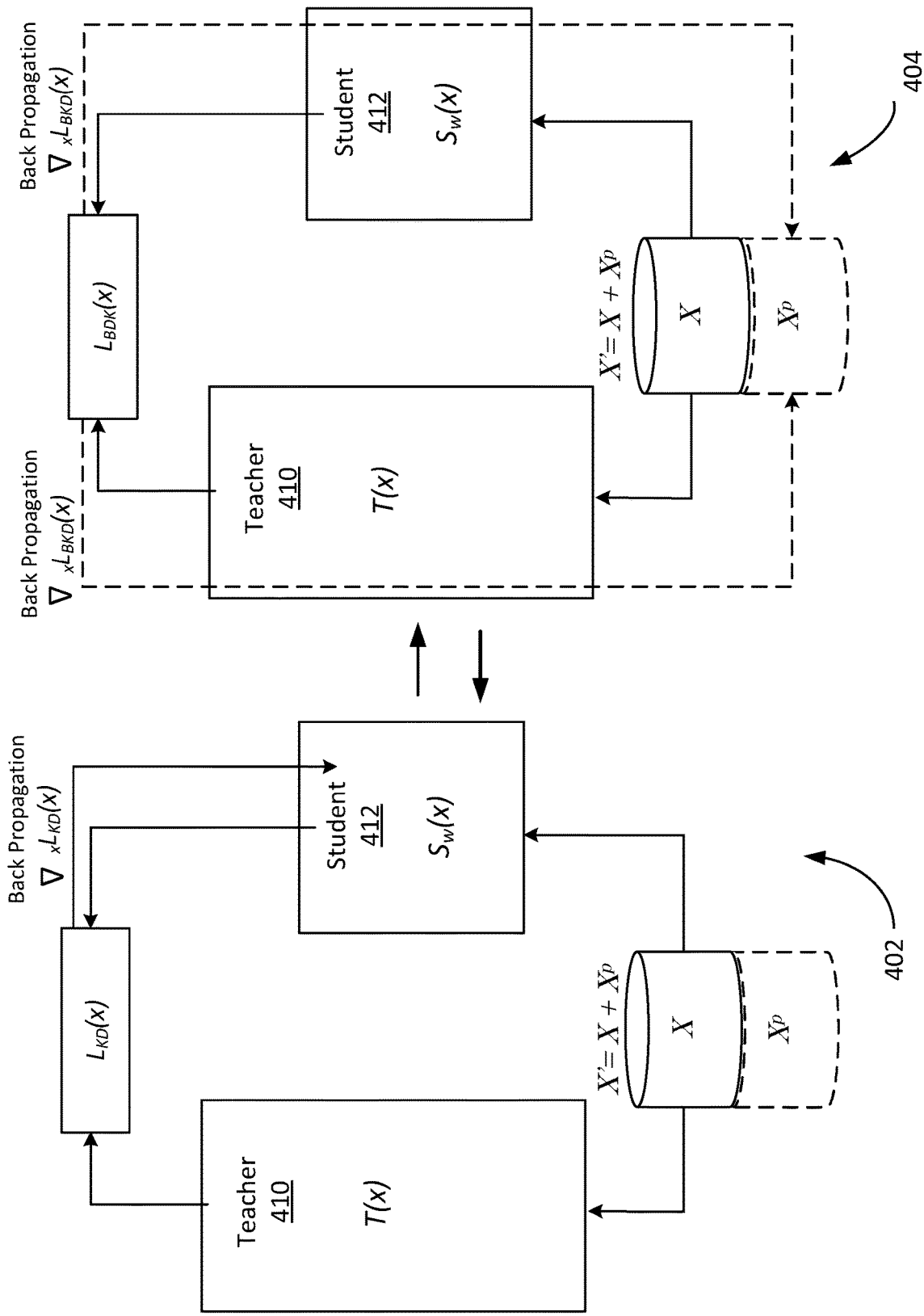
FIG. 4 is a block diagram of an example teacher deep neural network model that is used to train a student deep neural network model for a prediction task using the method of the present disclosure.

In this regard, FIG. 4 is a block diagram that further illustrates a system and method for knowledge distillation using backward pass knowledge. The dashed line arrows illustrate how backward pass knowledge is used to generate additional data samples $X^P$ that can be used to augment original training dataset X. In the example of FIG. 4, a trained teacher NN model 410, untrained student NN model 412 and initial unlabeled input values $\{\bar{x}_1, \ldots, \bar{x}_i, \ldots, \bar{x}_N\}$ corresponding to an input training dataset X. In some examples, trained teacher NN model 410 may be a DNN model that comprises several hidden layers and a large set of learned parameters that configure the operations of such layers. Untrained student NN model 412 may be a compressed DNN model relative to teacher NN model 410. For example, compared to teacher NN model 410, student NN model 412 may be compressed in one or more of the following ways: fewer number of layers; reduced number of weight parameters per layer; and use of quantized parameters and/or features to simplify computations.

An iterative two-step process is used to train student NN model 412 as follows. First, a minimization step 402 is performed to train the student model 412 using vanilla KD to transfer the teacher NN model 410 knowledge to the student model. In particular, teacher NN model 410 is first used to compute a set of output values $\{\bar{y}_1, \ldots, \bar{y}_i, \ldots, \bar{y}_N\}$ that correspond to the input values $\{\bar{x}_1, \ldots, \bar{x}_i, \ldots, \bar{x}_N\}$, providing a labelled training dataset X. The labelled training dataset X is then iteratively applied, using back propagation and gradient decent, to train student NN model 412 to learn a set of parameters (Ws) that will optimize the vanilla KD loss function of Equation (I) noted above. In this regard, forward pass knowledge of the teacher NN model 410 is transferred to the student NN model 412. Step 402 is referred to as a minimization step as student NN model 412 is learning parameters to minimize a first loss (e.g., a the loss incorporated into the vanilla KD loss function of Equation (I)) between its output values relative to those of the teacher NN model 410.

Next, a maximization step 404 is performed to learn a set of perturbed values $\{\bar{x}'_1, \ldots, \bar{x}'_i, \ldots, \bar{x}'_N\}$ that are perturbed versions of original input values $\{\bar{x}_1, \ldots, \bar{x}_i, \ldots, \bar{x}_N\}$. Step 404 is referred to as a maximization step as the student NN model 412 and teacher NN model 410 are collectively used to learn auxiliary input values $\{\bar{x}'_1, \ldots, \bar{x}'_i, \ldots, \bar{x}'_N\}$ that will maximize a second loss between the output values of the student NN model 412 and the teacher NN model 410. In this regard, input samples are repeated perturbed using the perturbation formula of Equation (II) noted above to maximize the loss function:

$$\mathcal{L}_{BKD} = \|S(x) - T(x)\|_2^2$$

The resulting auxiliary input values $\{\bar{x}'_1, \ldots, \bar{x}'_i, \ldots, \bar{x}'_N\}$ can then be combined with the original input values $\{\bar{x}_1, \ldots, \bar{x}_i, \ldots, \bar{x}_N\}$ to provide an augmented dataset of input values $\{\bar{x}_1, \bar{x}'_1, \ldots, \bar{x}_i, \bar{x}'_i, \ldots, \bar{x}_N, \bar{x}'_N\}$.

Minimization step 402 is then repeated using the augmented dataset of input values $\{\bar{x}_1, \bar{x}'_1, \ldots, \bar{x}_i, \bar{x}'_i, \ldots, \bar{x}_N, \bar{x}'_N\}$. In particular, teacher NN model 410 is first used to compute a set of output values $\{\bar{y}_1, \bar{y}'_1, \ldots, \bar{y}_i, \bar{y}'_i, \ldots, \bar{y}_N, \bar{y}'_N\}$ that correspond to the input values $\{\bar{x}_1, \bar{x}'_1, \ldots,$ $\bar{x}_i, \bar{x}'_i, \ldots, \bar{x}_N, \bar{x}'_N\}$, providing augmented labelled training dataset X', which is then used to retrain student NN model 412 using vanilla KD.

Maximization step 404 can then be repeated to learn a further set of perturbed values $\{\bar{x}'_1, \ldots, \bar{x}'_i, \ldots, \bar{x}'_N\}$ that are perturbed versions of original input values $\{\bar{x}_1, \ldots, \bar{x}_i, \ldots, \bar{x}_N\}$ based on the retrained student NN model 412.

The further set of perturbed values can then be combined with the original input values $\{\bar{x}'_1, \ldots, \bar{x}'_i, \ldots, \bar{x}'_N\}$ to provide a further augmented dataset of input values $\{\bar{x}_1, \bar{x}'_1, \ldots, \bar{x}_i, \bar{x}'_i, \ldots, \bar{x}_N, \bar{x}'_N\}$, that can then be used for another minimization step 402 to again retrain student NN model 412 using vanilla KD.

The minimization and maximization steps 402, 404 can be repeated a defined number of times or until a desired model performance is achieved. In the illustrated embodiment the size of the original training dataset is doubled after the initial minimization step 402. In the third and subsequent minimization steps 402, the input values in the original training dataset are maintained but the auxiliary input values are replaced with new input values generated by the maximization step 404.

Referring to FIG. 5A, an algorithm (referred to as Algorithm 2) that implements the method of the present disclosure is shown. The algorithm of FIG. 5A corresponds to the method and system described above in respect of FIG. 4. The input variables of the Proposed-KD(·) function are the student neural network model S(·), the teacher NN model T(·), the input values of the training dataset X, the number of training epochs e, and the number of hyper epochs h. In Algorithm 2, it is assumed that the teacher NNT(·) has been trained and the student neural network model S(·) has not yet been trained. Also, in Algorithm 2, X' is the set of augmented training data samples (i.e. the augmented training dataset). Algorithm 2 begins with initialization of the augment training dataset X' with training data set X in line 3 of Algorithm 2. In Algorithm 2, the outer loop of line 4 is performed each time the student NN model is trained using the Vanilla-KD(·) function for a few training epochs e. Then, in line 5 of Algorithm 2, the augmented training dataset X' is re-initialized with training dataset X and in lines 7 to 9 the inputs of the training data samples in the augmented training dataset X' are perturbed using the iterative perturbation algorithm noted above in order to generate new auxiliary training data samples. Then in line 10, the auxiliary training samples are added to the training dataset X and then the augmented training dataset X' with the training data set X. In the next iteration in line 5, Vanilla-KD(·) function will be fed with the augmented data training samples in the augmented dataset X'. Note that just in the first iteration Vanilla-KD(·) function is fed with original training dataset X.

The benefit of the method of the present disclosure is that instead of directly matching the gradients between teacher and student NN models, which is an intractable problem, the gradient of loss function between the teacher and student NN models results in a trained student NN model which is more efficient and tractable in real world problems. Further, in equation (III), the gradient of the defined loss function shows the direction of divergence between teacher and student NN models. This is the new knowledge that is extracted from the backward pass of the teacher NN models which provides a more accurate knowledge distillation procedure.

Figure 5B:
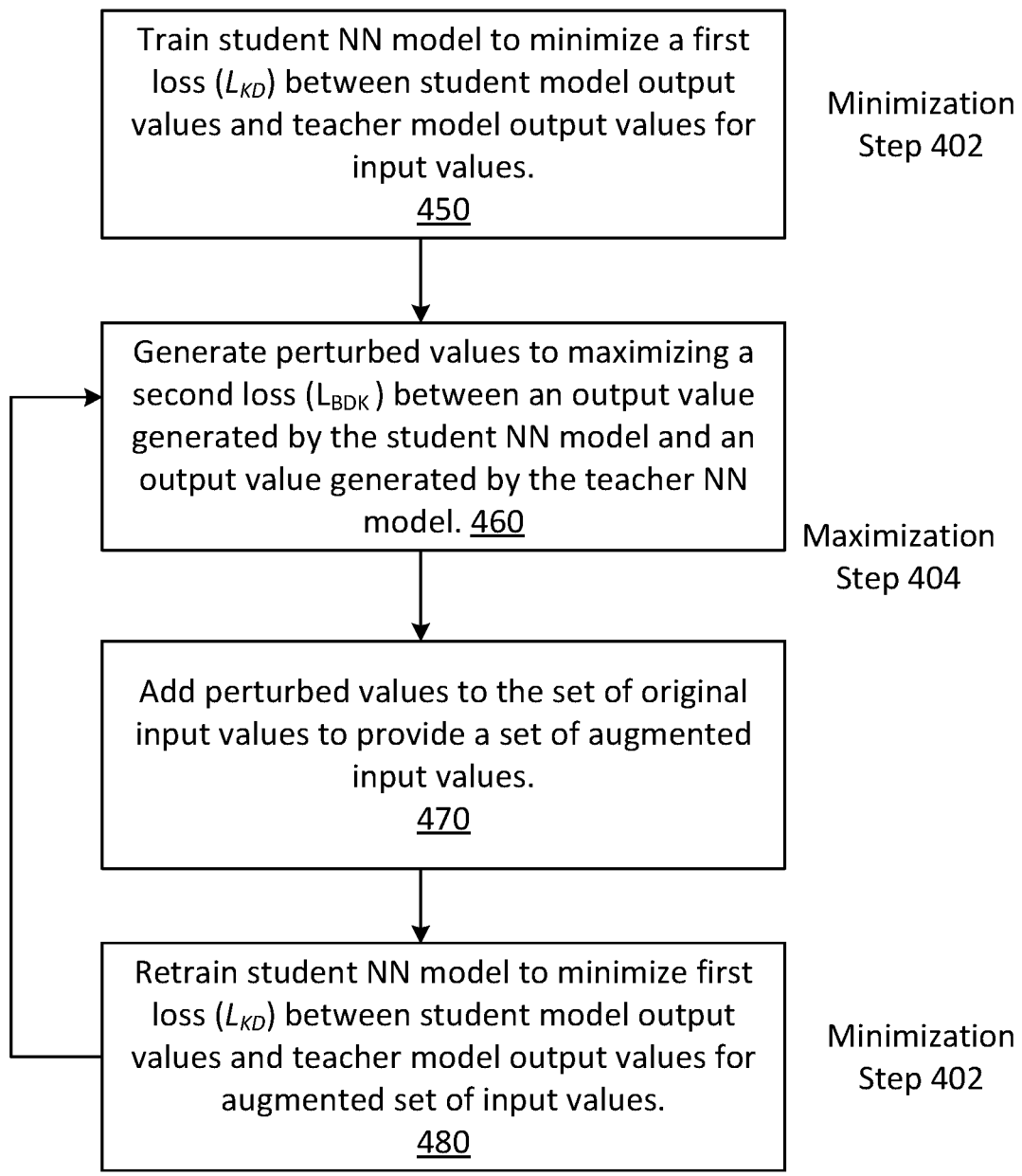
FIG. 5B illustrates a flow chart representing the example of FIG. 4.

Reference is now made to FIG. 5B, to describe an example implementation of the method described with reference to FIG. 4. The method may be carried out by routines or subroutines of software comprising machine executable instructions for execution by one or more processors of a processing system. Coding of software for carrying out for carrying out such steps is well within the scope of a person of ordinary skilled in the art having regard to the present disclosure. The method may contain additional or fewer processes than shown and described, and may be performed in a different order. Machine readable instructions of the software may be stored in a computer-readable medium. It is to be emphasized, that method shown in FIG. 5B need not be performed in the exact sequence as shown, unless otherwise indicated; and likewise various blocks may be performed in parallel rather than in sequence; hence the elements of the method shown in FIG. 5B are referred to herein as blocks rather than steps.

As indicated in bock 450, student NN model 412 is trained to minimize a first loss ($L_{KD}$) between student model output values generated by the student NN model 412 for a set of original input values and teacher model output values generated by teacher NN model 410 for the set of original input values. As indicated in block 460, perturbed values are generated for the original input values with the objective of maximizing a second loss ($L_{BDK}$) between a student model output value generated by the student NN model 412 and a teacher model output value generated by the teacher NN model. As indicated at block 470, the perturbed values are added to the set of original input values to provide a set of augmented input values. As indicated at bock 480, the student NN model 412 is then retrained to minimize the first loss ($L_{KD}$) between student model output values generated by the student NN model 412 for the set of augmented input values and the teacher model output values generated by the teacher NN model 410 for the set of augmented input values. The blocks 460 to 480 of the process of FIG. 5B can be repeated a defined number of times (e.g., h times).

In block 460, in some examples, the respective perturbed value for an original input value is generated by: setting an interim value equal to the original input value; generating a student model output value for the interim value and a teacher model output value for the interim value; determining a gradient of a squared difference between the student model output value and the teacher model output value; determining a perturbation value based on product of a defined perturbation rate and the gradient; adding the perturbation value to the interim value to update the interim value; repeating the preceding steps to select the interim value that maximizes the gradient of the squared difference, and using the selected interim value as the respective perturbed value.

Example for Natural Language Processing (NLP)

Figure 6:
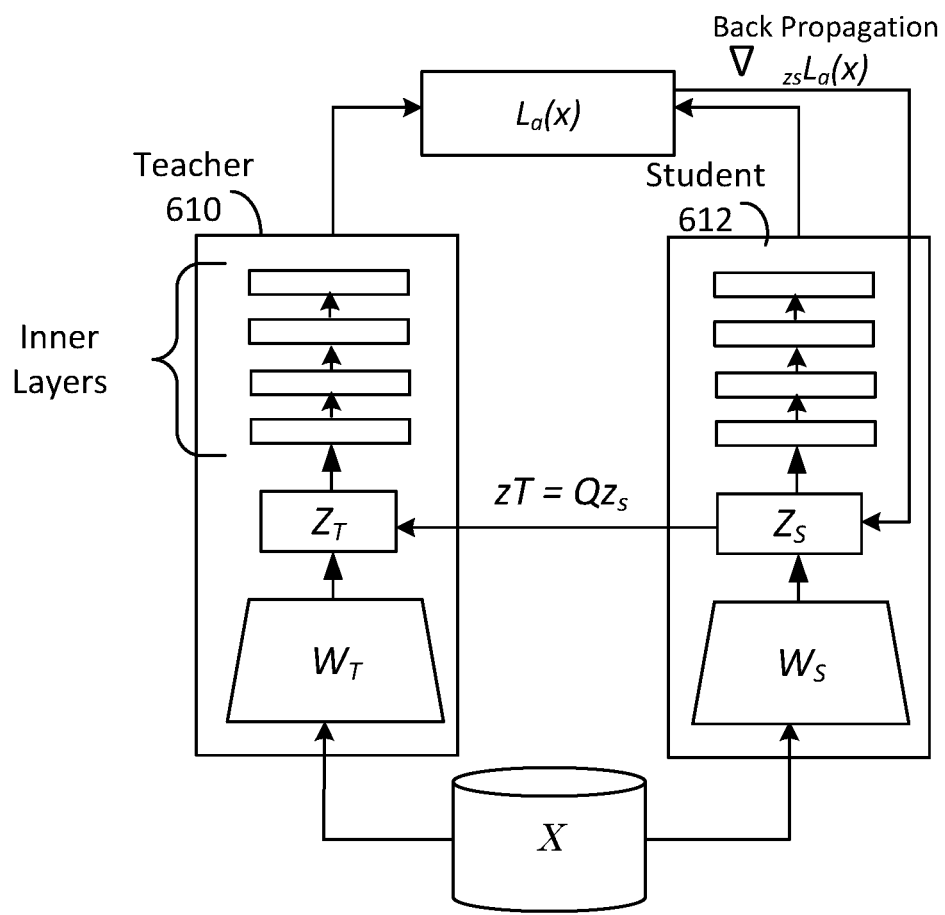
FIG. 6 is a block diagram of an example teacher deep neural network model that is used to train a student deep neural network model for a natural language processing task using the method of the present disclosure.

The following is a description of the implementation of the method of the present disclosure for the NLP and language understanding shown in FIG. 6, in which the training data training data samples are discrete data samples.

In NLP, the input data is text documents. Initially, the indices of tokens x of the text document are passed to NLP based NN models. Then these indices are converted into embedding vectors z and the embedding vectors of the input tokens are passed to a network. Converting a token index into embedding vector z of that index is accomplished by an inner product between one-hot vector of that index and an embedding matrix which literally contains all embedding vectors of indices. The embedding vectors z of input tokens x are not discrete and the gradient of loss function cannot be taken with respect to embedding vectors z. Accordingly, it will be appreciated that the above-described solution cannot be applied directly to the input tokens x. This is because, as illustrated in FIG. 6, in the case of KD based training, there are two NN models (student NN model 612 and teacher NN model 610) and each of these two NN models 612, 610 has their own respective embedding matrix $W_T$, $W_S$.

The gradient of the loss function w.r.t one of the embedding vectors (here student embedding vector $z_s$) can be computed, but then a transform matrix like Q is required to compute the corresponding embedding vector $z_T$ for the teacher NN model.

$$z_T = Qz_s \quad (IV)$$

The transform matrix Q is equal to the following equation:

$$Q = W_T W_s^T (W_s W_s^T)^{-1} \quad (V)$$

where in this equation $W_s^T(W_s W_s^T)^{-1}$ is the pseudo inverse of $W_s$ embedding matrix.

The proof is as follows:

$$z_T = W_T x$$

$$z_S = W_S x$$

The goal is to transform Q such that:

$$W_T = QW_s \quad (*)$$

To achieve this goal, the following optimization problem is solved by using list square method:

$$\min_Q \|W_T - QW_S\|^2 \xrightarrow{\text{least square}} Q = W_T W_s^T (W_s W_s^T)^{-1}$$

which results in:

$$W_T = QW_S$$

$$W_T x = QW_S x$$

$$z_T = Qz_S$$

Therefore, in order to generate the auxiliary training data samples, the gradient of the $l_2$-norm loss function is computed between the outputs of the teacher and student NN models 610, 612 w.r.t student embedding vector $z_s$. Then by using equations (IV) and (V), the student embedding vector $z_T$ may be reconstructed during perturbation of the input of the training data samples. FIG. shows an algorithm (Algorithm 3) for implementing the method of the present disclosure for a NLP application. Algorithm 3 similar to the Algorithm 2. The main difference between Algorithm 2 and Algorithm 3 is that the input of the training data samples of teacher and student NN models 610, 612 are separately considered in $Z_T$ and $Z_S$ matrices. In Algorithm 3 $Z_T$ and $Z_S$ are computed in lines 5 and 6. The teacher and student NN models 610, 612 are then provided separately with their own embedding vectors. In line 16 of Algorithm 3, the transform method described above is used to transform student perturbed embedding vectors into teacher embedding vectors.

It will this be noted that the flowchart of FIG. 5B can modified as follows to describe the NLP use case where the student NN model and the teacher NN model are each part of respective natural language processing models that are configured to perform NLP prediction tasks. In the NLP case, the original input values to the NN layers will include (i) a teacher set of input values that are vector embeddings $z_T$ of a set of token indexes generated in respect of a input text using a teacher model embedding matrix ($W_T$); and (ii) a student set of input values that are vector embeddings $z_s$ of the set of token indexes generated using a student embedding matrix ($W_s$). In block 450, training the student NN model comprises: training the student NN model 612 to minimize the first loss between student model output values generated by the student NN model 612 for the student set of input values $z_s$ and teacher model output values generated by the teacher NN model 610 for the teacher set of input values $z_t$; In block 460, generating the respective perturbed value for one of the original input values comprises: (i) generating a teacher perturbed value $z'_t$ and a student perturbed value $z's$, respectively, for the teacher value and the student value that that correspond to the original input value, wherein the teacher perturbed value and student perturbed value are related by a defined transform matrix Q and are generated to maximize the second loss La(x) between an output value generated by the student NN model 610 for the student perturbed value and an output value generated by the teacher NN model 610 for the teacher perturbed value. In block 470, the set of augmented input values includes: (i) an augmented teacher set comprised of the teacher perturbed values $z'_t$ and the teacher set of input values $z_t$, and (ii) an augmented student set comprised of the student perturbed values $z's$ and the student set of input values $z_s$. In block 480, retraining the student NN model 612 comprises: training the student NN model 612 to minimize the first loss between student model output values generated by the student NN model 612 for the augmented student set and teacher model output values generated by the teacher NN model 610 for the augmented teacher set.

Figure 8:
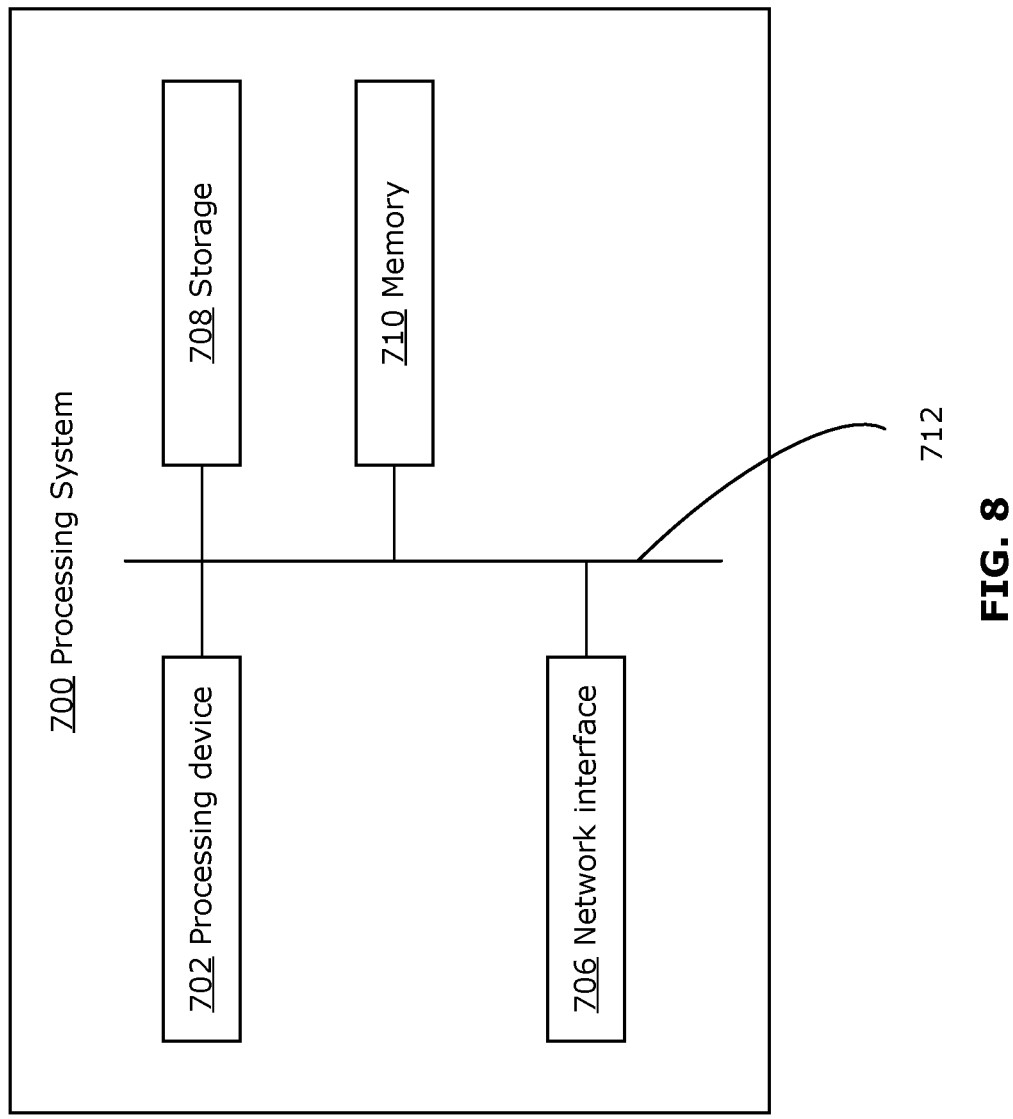
FIG. 8 is a block diagram illustrating an example processing system that may be used to execute machine readable instructions of the method of the present disclosure.

FIG. 8 is a block diagram of an example processing system that includes a processing unit 700, which may be used to perform the method of the present disclosure. Other processing unit configurations suitable for implementing embodiments described in the present disclosure may be used, which may include components different from those discussed below. For example, a dedicated hardware circuit, such as an ASIC or FPGA may be used to perform the method of the present disclosure. Although FIG. 8 shows a single instance of each component, there may be multiple instances of each component in the processing unit 700.

The processing unit 700 may include one or more processing devices 702, such as a processor, a microprocessor, an application-specific integrated circuit (ASIC), a field-programmable gate array (FPGA), a dedicated logic circuitry, or combinations thereof. In example embodiments, a processing unit 800 that is used for training purposes may include an accelerator 806 connected to the processing device 702. The processing unit 700 may include one or more network interfaces 706 for wired or wireless communication with a network (e.g., an intranet, the Internet, a P2P network, a WAN and/or a LAN) or other node. The network interfaces 706 may include wired links (e.g., Ethernet cable) and/or wireless links (e.g., one or more antennas) for intra-network and/or inter-network communications.

The processing unit 700 may also include one or more storage units 708, which may include a mass storage unit such as a solid state drive, a hard disk drive, a magnetic disk drive and/or an optical disk drive. The processing unit 700 may include one or more memories 710, which may include a volatile or non-volatile memory (e.g., a flash memory, a random access memory (RAM), and/or a read-only memory (ROM)). The non-transitory memory(ies) 710 may store instructions for execution by the processing device(s) 702, such as to carry out examples described in the present disclosure. The memory(ies) 710 may include other software instructions, such as for implementing an operating system and other applications/functions. In some examples, memory 710 may include software instructions for execution by the processing device 702 to implement and train the student neural network model using the method of the present disclosure. In some examples, memory 710 may include software instructions and data (e.g., weight and threshold parameters) for execution by the processing device 702 to implement a trained teacher neural network model and/or a student neural network model.

In some examples, one or more training data sets and/or modules may be provided by an external memory (e.g., an external drive in wired or wireless communication with the processing unit 700) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 712 providing communication among components of the processing unit 700, including the processing device(s) 702, I/O interface(s) 704, network interface(s) 706, storage unit(s) 708 and/or memory(ies) 710. The bus 712 may be any suitable bus architecture including, for example, a memory bus, a peripheral bus or a video bus.

Although FIG. 8 shows a processing device which may be used to perform the method of the present disclosure, it will be appreciated that other types of computing devices may be used to perform the method of the present disclosure. For example, a cloud computing system may be used to which may be used to perform the method of the present disclosure or one or more virtual machines instantiated by a cloud computing service provider may be used to perform the method of the present disclosure. Thus, any computing system having sufficient processing and memory resources may be used may be used to perform the method of the present disclosure.

Figure 9:
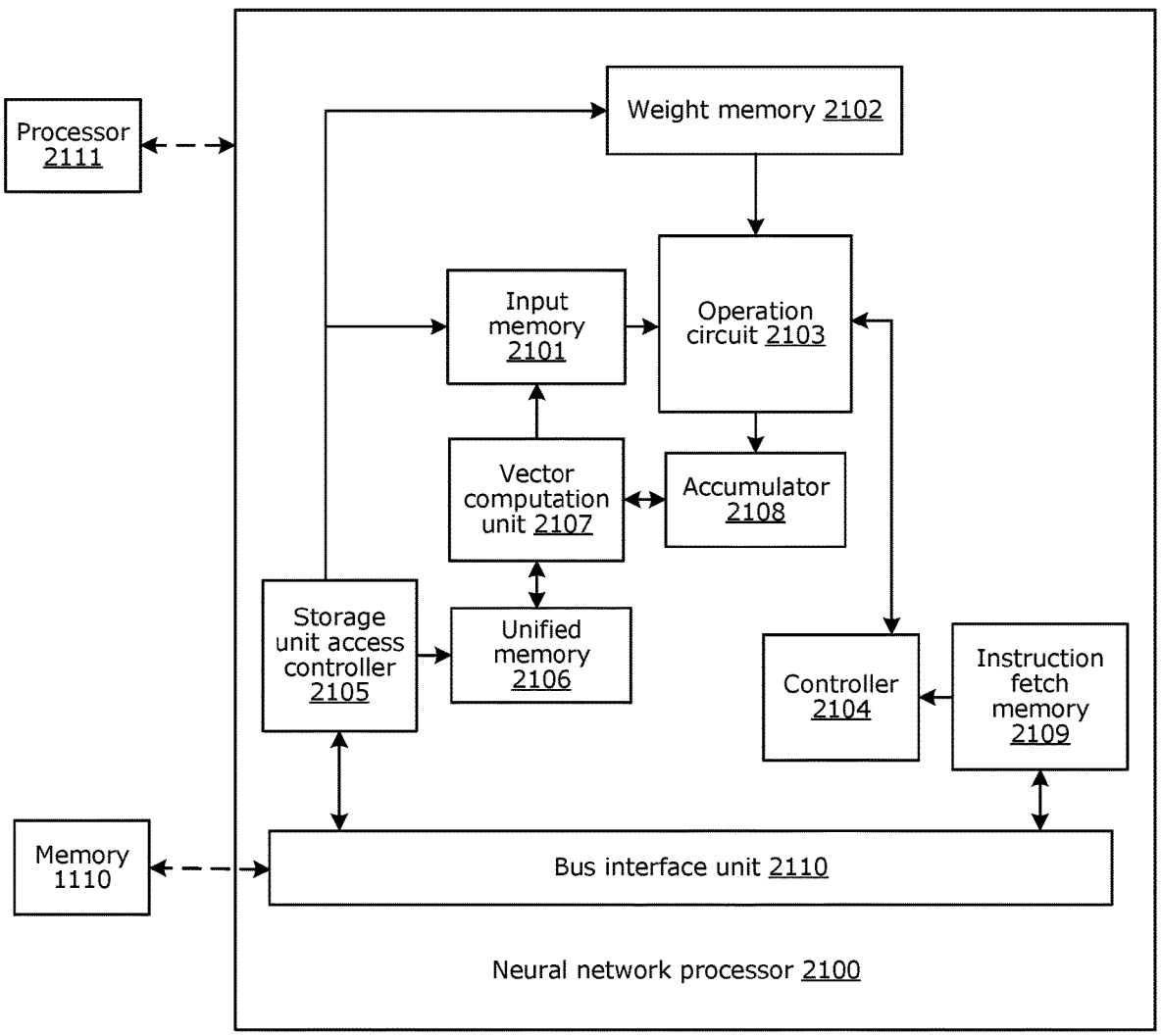
FIG. 9 is a block diagram of a illustrating an example hardware structure of a NN processor, in accordance with an example embodiment.

FIG. 9 is a block diagram illustrating an example hardware structure of an example NN processor 2100 of the processing device 702 which may perform NN computations of NN model, including the NN computations of the NN models 410, 412, 610 and 612, according to some example embodiments of the present disclosure. The NN processor 2100 may be provided on an integrated circuit (also referred to as a computer chip). All the NN computations of the layers of the NN models 410, 412, 610 and 612 may be performed using the NN processor 2100.

The processing devices(s) 702 (FIG. 8) may include a further processor 2111 in combination with NN processor 2100. The NN processor 2100 may be any processor that is applicable to NN computations, for example, a Neural Processing Unit (NPU), a tensor processing unit (TPU), a graphics processing unit (GPU), or the like. The NPU is used as an example. The NPU may be mounted, as a coprocessor, to the processor 2111, and the processor 2111 allocates a task to the NPU. A core part of the NPU is an operation circuit 2103. A controller 2104 controls the operation circuit 2103 to extract matrix data from memories (2101 and 2102) and perform multiplication and addition operations.

In some implementations, the operation circuit 2103 internally includes a plurality of processing units (Process Engine, PE). In some implementations, the operation circuit 2103 is a bi-dimensional systolic array. Besides, the operation circuit 2103 may be a uni-dimensional systolic array or another electronic circuit that can implement a mathematical operation such as multiplication and addition. In some implementations, the operation circuit 2103 is a general matrix processor.

For example, it is assumed that there are an input matrix A, a weight matrix B, and an output matrix C. The operation circuit 2103 obtains, from a weight memory 2102, weight data of the matrix B and caches the data in each PE in the operation circuit 2103. The operation circuit 2103 obtains input data of the matrix A from an input memory 2101 and performs a matrix operation based on the input data of the matrix A and the weight data of the matrix B. An obtained partial or final matrix result is stored in an accumulator (accumulator) 2108.

A unified memory 2106 is configured to store input data and output data. Weight data is directly moved to the weight memory 2102 by using a storage unit access controller 2105 (Direct Memory Access Controller, DMAC). The input data is also moved to the unified memory 2106 by using the DMAC.

A bus interface unit (BIU, Bus Interface Unit) 2110 is used for interaction between the DMAC and an instruction fetch memory 2109 (Instruction Fetch Buffer). The bus interface unit 2110 is further configured to enable the instruction fetch memory 2109 to obtain an instruction from the memory 1110, and is further configured to enable the storage unit access controller 2105 to obtain, from the memory 1110, source data of the input matrix A or the weight matrix B.

The DMAC is mainly configured to move input data from memory 1110 Double Data Rate (DDR) to the unified memory 2106, or move the weight data to the weight memory 2102, or move the input data to the input memory 2101.

A vector computation unit 2107 includes a plurality of operation processing units. If needed, the vector computation unit 2107 performs further processing, for example, vector multiplication, vector addition, an exponent operation, a logarithm operation, or magnitude comparison, on an output from the operation circuit 2103. The vector computation unit 2107 is mainly used for computation at a neuron or a layer (described below) of a neural network.

In some implementations, the vector computation unit 2107 stores a processed vector to the unified memory 2106. The instruction fetch memory 2109 (Instruction Fetch Buffer) connected to the controller 2104 is configured to store an instruction used by the controller 2104.

The unified memory 2106, the input memory 2101, the weight memory 2102, and the instruction fetch memory 2109 are all on-chip memories. The memory 1110 is independent of the hardware architecture of the NPU 2100.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The content of all publishes papers identified in this disclosure are incorporated herein by reference.

The invention claimed is:

1. A method for compressing a neural network (NN) model through knowledge distillation, the method comprising:
   training a student NN model using a knowledge distillation process to minimize a first loss function between student model output values generated by the student NN model for a set of original input values and teacher model output values generated by a teacher NN model for the set of original input values;
   generating, during a backpropagation phase of the knowledge distillation process, for at least some of the original input values, a respective perturbed value that corresponds to a training data gap in the set of original input values, wherein generating the respective perturbed value for an input value comprises:
      perturbing the input value along a direction of a gradient of a second loss function between an output value generated by the student NN model and an output value generated by the teacher NN model; and
      selecting, as the respective perturbed input value, a perturbed version of the input value that maximizes the second loss function;
   adding the perturbed values to the set of original input values to provide a set of augmented input values;
   retraining the student NN model to minimize the first loss function between output values generated by the student NN model for the set of augmented input values and output values generated by the teacher NN model for the set of augmented input values, wherein the retrained student NN model is a compressed model relative to the teacher NN model; and
   deploying the retrained student NN model to a computationally constrained hardware device, to cause the device to perform an inference task, using the retrained student NN model with respect to input data.

2. The method of claim 1, further comprising, after retraining the student NN model:
   2a) generating, for at least some of the original input values, a further respective perturbed value that maximizes the second loss function between an output value generated by the student NN model and an output value generated by the teacher NN model;
   2b) adding the further perturbed values to the set of original input values to provide a further set of augmented input values; and
   2c) further retraining the student NN model to minimize the first loss function between output values generated by the student NN model for the further set of augmented input values and output values generated by the teacher NN model for the further set of augmented input values.

3. The method of claim 2, wherein 2a), 2b) and 2c) are successively repeated a plurality of times.

4. The method of claim 1, wherein generating the respective perturbed value comprises applying stochastic gradient ascent to select the perturbed value.

5. The method of claim 4, wherein the second loss function corresponds to an $l_2$-norm loss function.

6. The method of claim 1, wherein generating the respective perturbed value for an original input value comprises:
   6a) setting an interim value equal to the original input value;
   6b) generating a student model output value for the interim value and a teacher model output value for the interim value;
   6c) determining a gradient of a squared difference between the student model output value and the teacher model output value;
   6d) determining a perturbation value based on a product of a defined perturbation rate and the gradient;
   6e) adding the perturbation value to the interim value to update the interim value;
   6f) repeating 6b) to 6e) to select the interim value that maximizes the gradient of the squared difference, and using the selected interim value as the respective perturbed value.

7. The method of claim 1, wherein the first loss function corresponds to a knowledge distillation loss function.

8. The method of claim 1, wherein the student NN model and the teacher NN model are each part of respective natural language processing models that are configured to perform natural language processing (NLP) prediction tasks, wherein:
   the original input values comprise: (i) a teacher set of input values that are vector embeddings of a set of token indexes generated in respect of an input text using a teacher model embedding matrix; and (ii) a student set of input values that are vector embeddings of the set of token indexes generated using a student embedding matrix;
   training the student NN model comprises: training the student NN model to minimize the first loss function between student model output values generated by the student NN model for the student set of input values and teacher model output values generated by the teacher NN model for the teacher set of input values;
   generating the respective perturbed value for one of the original input values comprises: (i) generating a teacher perturbed value and a student perturbed value, respectively, for the teacher value and the student value that correspond to the original input value, wherein the teacher perturbed value and student perturbed value are related by a defined transform matrix and are generated to maximize the second loss function between an output value generated by the student NN model for the student perturbed value and an output value generated by the teacher NN model for the teacher perturbed value;
   the set of augmented input values includes: (i) an augmented teacher set comprised of the teacher perturbed values and the teacher set of input values, and (ii) an augmented student set comprised of the student perturbed values and the student set of input values; and retraining the student NN model comprises: training the student NN model to minimize the first loss function between student model output values generated by the student NN model for the augmented student set and teacher model output values generated by the teacher NN model for the augmented teacher set.

9. The method of claim 8, wherein the student perturbed values are determined based on a gradient of the second loss function computed with respect to the student perturbed values, and the teacher perturbed values are determined by transforming corresponding student perturbed values.

10. The method of claim 1, wherein the inference task is a natural language processing (NLP) prediction task.

11. A system comprising one or more processing devices and one or more memories storing non-transitory instructions that when executed by the one or more processing devices configure the one or more processing devices to:
train a student neural network (NN) model using a knowledge distillation process to minimize a first loss function between student model output values generated by the student NN model for a set of original input values and teacher model output values generated by a teacher NN model for the set of original input values;
generate, during a backpropagation phase of the knowledge distillation process, for at least some of the original input values, a respective perturbed value that corresponds to a training data gap in the set of original input values by:
perturbing the input value along a direction of a gradient of a second loss function between an output value generated by the student NN model and an output value generated by the teacher NN model; and
selecting, as the respective perturbed input value, a perturbed version of the input value that maximizes the second loss function;
add the perturbed values to the set of original input values to provide a set of augmented input values;
retrain the student NN model to minimize the first loss function between output values generated by the student NN model for the set of augmented input values and output values generated by the teacher NN model for the set of augmented input values, wherein the retrained student NN model is a compressed model relative to the teacher NN model; and
deploy the retrained student NN model to a computationally constrained hardware device, to cause the device to perform an inference task, using the retrained student NN model with respect to input data.

12. The system of claim 11, wherein the one or more processing devices are further configured to, after retraining the student NN model:
12a) generate, for at least some of the original input values, a further respective perturbed value that maximizes the second loss function between an output value generated by the student NN model and an output value generated by the teacher NN model;
12b) add the further perturbed values to the set of original input values to provide a further set of augmented input values; and
12c) further retrain the student NN model to minimize the first loss function between output values generated by the student NN model for the further set of augmented input values and output values generated by the teacher NN model for the further set of augmented input values.

13. The system of claim 12, wherein 12a), 12b) and 12c) are successively repeated a plurality of times.

14. The system of claim 11, wherein the respective perturbed value is generated by applying stochastic gradient ascent to select the perturbed value.

15. The system of claim 14, wherein the second loss function corresponds to an $l_2$-norm loss function.

16. The system of claim 11, wherein the respective perturbed value for an original input value is generated by:
16a) setting an interim value equal to the original input value;
16b) generating a student model output value for the interim value and a teacher model output value for the interim value;
16c) determining a gradient of a squared difference between the student model output value and the teacher model output value;
16d) determining a perturbation value based on product of a defined perturbation rate and the gradient;
16e) adding the perturbation value to the interim value to update the interim value;
16f) repeating 16b) to 16e) to select the interim value that maximizes the gradient of the squared difference, and using the selected interim value as the respective perturbed value.

17. The system of claim 11, wherein the first loss function corresponds to a knowledge distillation loss function.

18. The system of claim 11, wherein the student NN model and the teacher NN model are each part of respective natural language processing models that are configured to perform natural language processing (NLP) prediction tasks, wherein:
the original input values comprise: (i) a teacher set of input values that are vector embeddings of a set of token indexes generated in respect of an input text using a teacher model embedding matrix; and (ii) a student set of input values that are vector embeddings of the set of token indexes generated using a student embedding matrix;
the student NN model is trained by: training the student NN model to minimize the first loss function between student model output values generated by the student NN model for the student set of input values and teacher model output values generated by the teacher NN model for the teacher set of input values;
the respective perturbed value for one of the original input values is generated by: (i) generating a teacher perturbed value and a student perturbed value, respectively, for the teacher value and the student value that correspond to the original input value, wherein the teacher perturbed value and student perturbed value are related by a defined transform matrix and are generated to maximize the second loss function between an output value generated by the student NN model for the student perturbed value and an output value generated by the teacher NN model for the teacher perturbed value;
the set of augmented input values includes: (i) an augmented teacher set comprised of the teacher perturbed values and the teacher set of input values, and (ii) an augmented student set comprised of the student perturbed values and the student set of input values; and
the student NN model is retrained by: training the student NN model to minimize the first loss function between student model output values generated by the student NN model for the augmented student set and teacher model output values generated by the teacher NN model for the augmented teacher set.

19. The system of claim 18 wherein the student perturbed values are determined based on a gradient of the second loss function computed with respect to the student perturbed values, and the teacher perturbed values are determined by transforming corresponding student perturbed values.

20. A method for compressing a neural network (NN) model through knowledge distillation, the method comprising:

training a student NN model using a knowledge distillation process to minimize a first loss function between student model output values generated by the student NN model for a set of original input values and teacher model output values generated by a teacher NN model for the set of original input values;

identifying a divergence region associated with the teacher NN model and the student NN model by generating, during a backpropagation phase of the knowledge distillation process, for at least some of the original input values, a respective perturbed input value by:

perturbing the input value along a direction of a gradient of a second loss function between an output value generated by the student NN model and an output value generated by the teacher NN model, the second loss function quantifying the divergence region; and selecting, as the respective perturbed input value, a perturbed version of the input value that maximizes the second loss function, wherein the divergence region corresponds to a training data gap in the set of original input values;

adding the perturbed values to the set of original input values to provide a set of augmented input values, the set of augmented input values representing an augmented training dataset;

retraining the student NN model using the augmented training dataset to minimize the first loss function between output values generated by the student NN model for the set of augmented input values and output values generated by the teacher NN model for the set of augmented input values, with effect that the retrained student NN model achieves improved alignment with the teacher NN model across an input space including the identified divergence region, wherein the retrained student NN model is a compressed model relative to the teacher NN model; and deploying the retrained student NN model to a computationally constrained hardware device, to cause the device to perform one or more inference tasks using the retrained student NN model with respect to input data.

* * * * *